United States Patent
Shi et al.

(10) Patent No.: US 7,102,807 B2
(45) Date of Patent: Sep. 5, 2006

(54) HIGH-SPEED ELECTRO-ABSORPTION MODULATOR WITH LOW DRIVE VOLTAGE

(75) Inventors: Jin-Wei Shi, Taipei (TW); Chen-An Hsieh, Jhongli (TW)

(73) Assignee: National Central University, Taoyuan (TW)

( * ) Notice: Subject to any disclaimer, the term of this patent is extended or adjusted under 35 U.S.C. 154(b) by 0 days.

(21) Appl. No.: 10/967,161

(22) Filed: Oct. 19, 2004

(65) Prior Publication Data

US 2006/0082855 A1    Apr. 20, 2006

(51) Int. Cl.
    *G02F 1/03*    (2006.01)
(52) U.S. Cl. ..................................... 359/245
(58) Field of Classification Search ............. 359/245, 359/246, 247, 248, 260, 322; 257/21, 97, 257/85
    See application file for complete search history.

(56) References Cited

U.S. PATENT DOCUMENTS

| 5,165,105 | A | | 11/1992 | Haase et al. .................... 385/8 |
| 5,416,338 | A | * | 5/1995 | Suzuki et al. ................. 257/21 |
| 5,909,303 | A | * | 6/1999 | Trezza et al. ................ 359/248 |
| 6,194,290 | B1 | * | 2/2001 | Kub et al. .................... 438/455 |
| 6,426,236 | B1 | | 7/2002 | Ishizaka et al. ............... 438/29 |
| 2004/0081389 | A1 | * | 4/2004 | Soda et al. .................... 385/16 |

* cited by examiner

*Primary Examiner*—Ricky Mack
*Assistant Examiner*—Tuyen Tra
(74) *Attorney, Agent, or Firm*—Troxell Law Office PLLC (57) ABSTRACT

The present invention is an electro-absorption modulator with a p-i-n-i-n epitaxy layer whose structure is p-i(MQW)-$n^+$-i(collector)-n to release the trade-off between the operation voltage and the speed, to increase the confinement factor of the light in the un-doped layers, and to reduce the insertion loss caused by the free-carrier absorption in the doped layers, wherein MQW stands for Multiple-Quantum Well.

1 Claim, 8 Drawing Sheets

HIGH-SPEED ELECTRO-ABSORPTION MODULATOR WITH LOW DRIVE VOLTAGE

FIELD OF THE INVENTION

The present invention relates to an electro-absorption modulator; more particularly, relates to a p-i-n-i-n epitaxy layer with an epitaxy structure of p-i(MQW)-n$^+$-i(collector)-n which is grown on a semiconductor substrate and can be applied to an optical modulator, wherein MQW stands for Multiple-Quantum Well.

DESCRIPTION OF THE RELATED ART

In modern high-speed optical communication system, an optical modulator with a speed over 10 Gbps (bits per second) is a very critical part. The optical modulators used today are mainly divided into two kinds: some are Electro-Absorption Modulators (EAM) and the others are Electro-Optics Modulators (EOM). The EAM of the prior art has a big insertion loss and the impedances of the components are too low, which limits its performance with traveling-wave electrode structure.

Figure 5:
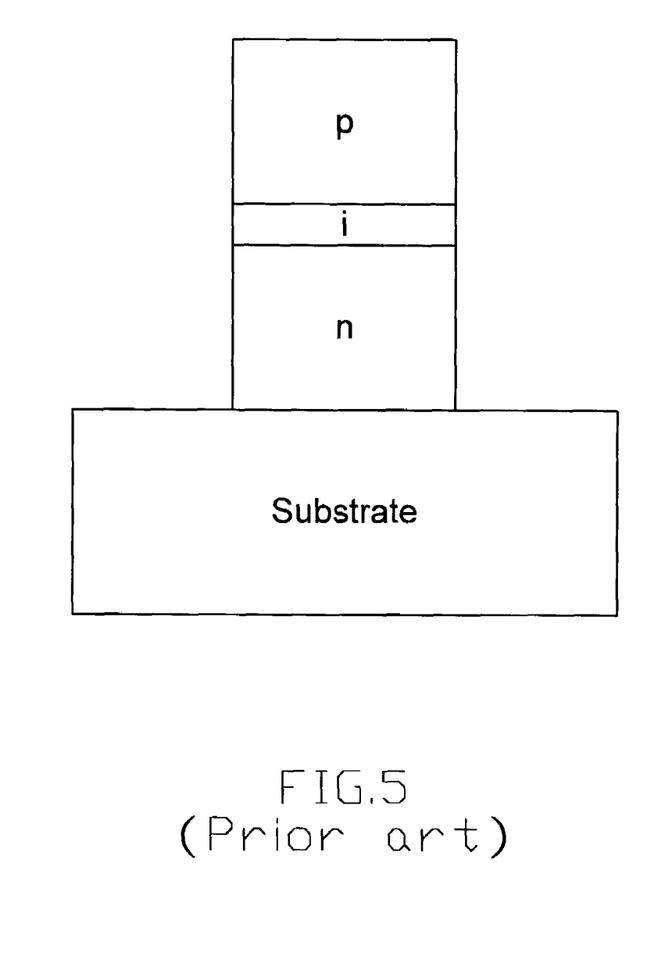
FIG. 5 is a view showing an epitaxy structure of an EAM according to the prior art.

Please refer to FIG. 5, which is a view showing a structure of an epitaxy of an EAM according to the prior art. As shown in the figure, the structure of the EAM according to the prior art is a p-i-n epitaxy structure, comprising a p-doped layer, an intrinsic layer (i-layer) and an n-doped layer, which are grown on a substrate in a top-down way. The i-layer comprises an MQW or bulk structure to absorb the incident light; and the outside electric field is confined in this layer to be modulated. Yet, the biggest problem of the p-i-n epitaxy structure is as follows: In order to reduce the operation voltage, the thickness of the i-layer can not be thick; but a thin i-layer has a quite big device capacitance so that the performance of the component becomes worse. Through, by thickening the photon-absorption layer or shrinking the geometry size of the components, the system capacitance can be reduced to increase the impedance of the components and the speed of the microwave. However, a thick intrinsic layer and a small device size imply a high operation voltage and a serious optical coupling/insertion loss, respectively.

SUMMARY OF THE INVENTION

Therefore, the main purposes of the present invention is to release the trade-off between the drive voltage and the speed, to increase the confinement factor of the light in the un-doped layer, and to reduce the insertion loss of the light caused by the free-carrier absorption in the doped layer.

To achieve the above purposes, the present invention is a high-speed EAM with low drive voltage, comprising a p-i-n-i-n epitaxy layer formed on a semiconductor substrate 2. The p-i-n-i-n epitaxy layer 1 comprises a p-doped layer, a first intrinsic layer (i-layer), a first n-doped layer (n-layer), a second i-layer and a second n-layer, which are grown as epitaxy layers to obtain the EAM. The epitaxy structure of the EAM according to the present invention is p-i(MQW)-n$^+$-i(collector)-n. Because the first n-layer is inserted into the un-doped depletion layer to be an electric-field confining layer so that most of the electric field is concentrated in the first i-layer (MQW) to avoid the increase of the drive voltage while the thickness of the second i-layer (collector) is increased. Besides, the thickness of the un-doped layer is greatly increased. Accordingly, the trade-off between the drive voltage and the speed can be released, the confinement factor of the light in the un-doped layers can be increased, and the insertion loss of the light caused by the free-carrier absorption in the doped regions can be reduced.

BRIEF DESCRIPTIONS OF THE DRAWINGS

The present invention will be better understood from the following detailed description of preferred embodiments of the invention, taken in conjunction with the accompanying drawings, in which.

DESCRIPTION OF THE PREFERRED EMBODIMENT

The following descriptions of the preferred embodiments are provided to understand the features and the structures of the present invention.

Figure 1A:
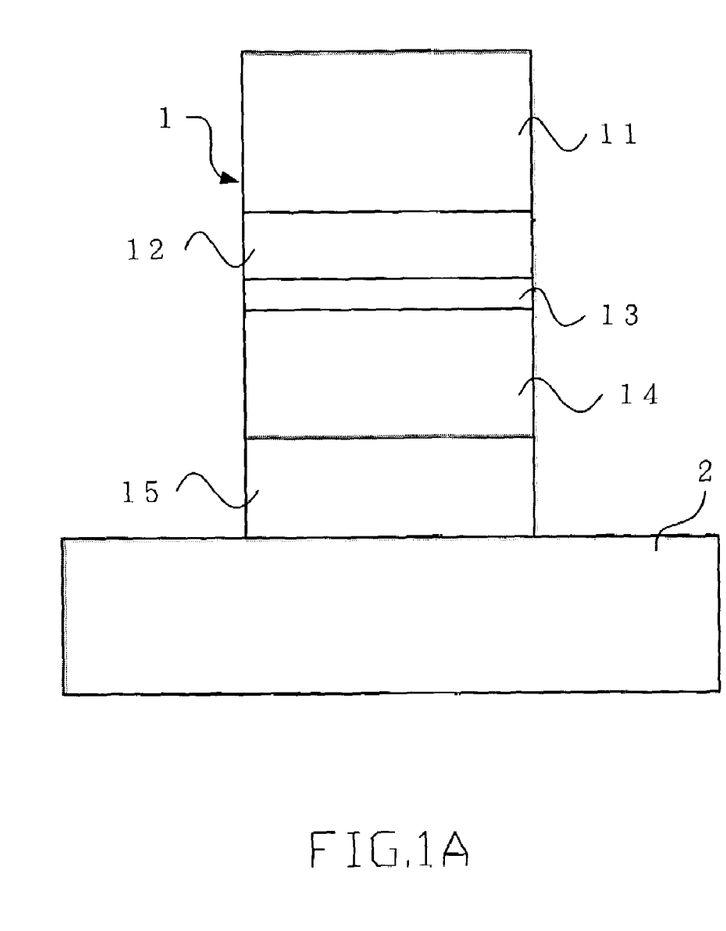
FIG. 1A is a view showing an epitaxy structure of an electro-absorption modulator (EAM) according to the present invention.
Figure 1B:
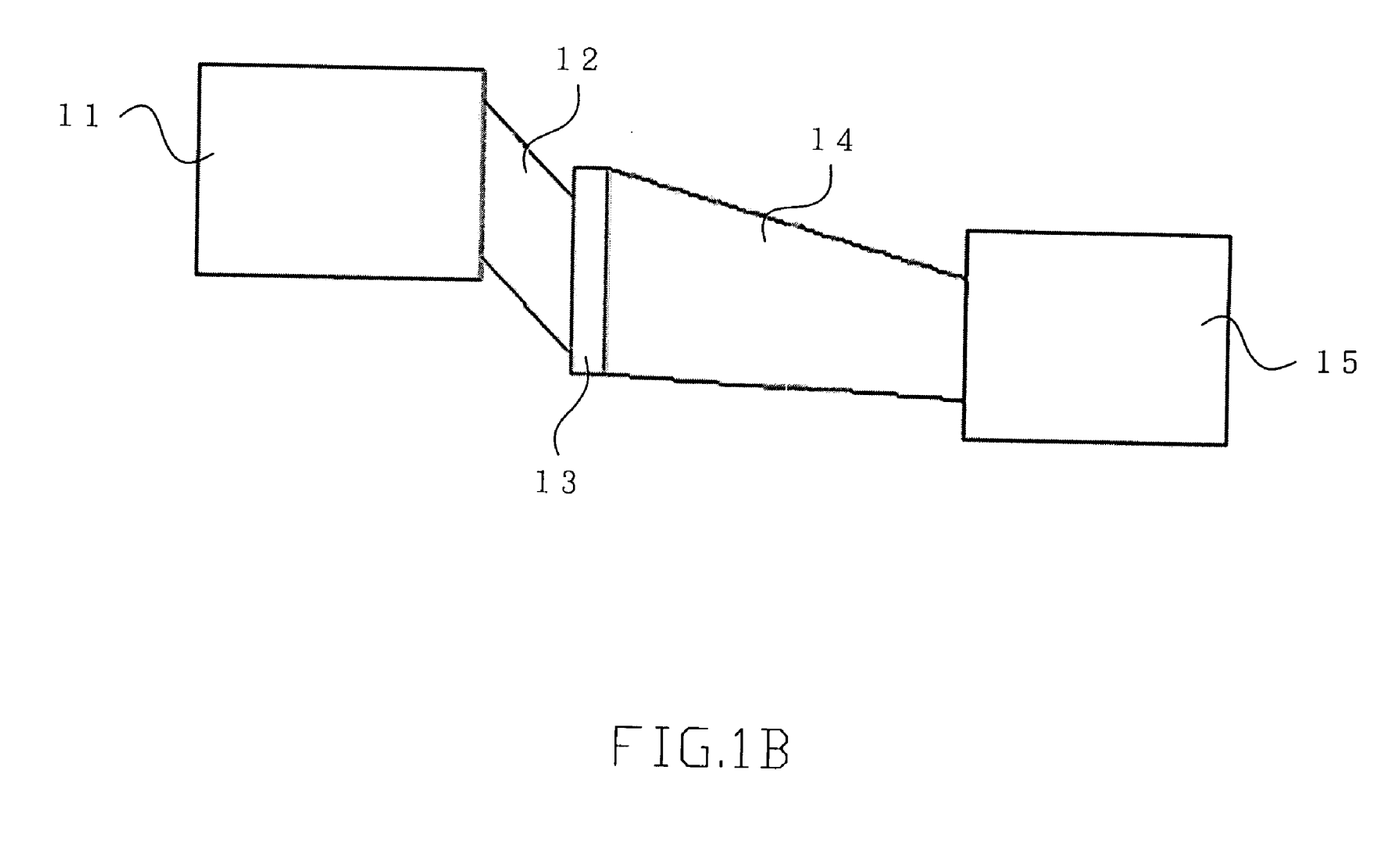
FIG. 1B is a view showing an EAM according to the present invention.

Please refer to FIG. 1A and FIG. 1B, which, according to the present invention, are views showing an epitaxy structure of an EAM and the EAM itself. As shown in the figures, The present invention is an EAM, comprising a p-i-n-i-n epitaxy layer 1 (formed by doping GaAs, InP and GaN; or by doping AlN, Si and GaSb) formed on a semiconductor substrate 2. The p-i-n-i-n epitaxy layer 1 comprises a second intrinsic layer 14 (i-layer) formed on a second n-doped layer 15 (n-layer); a first n-layer 13 formed on the second i-layer 14; a first i-layer 12 formed on the first n-layer 13; and a p-doped layer 11 (p-layer) formed on the first i-layer 12. Its structure is formed by a semiconductor of any compound (such as GaAs, InP or GaN) or any column element together with a semiconductor of its alloy (such as a compound semiconductor of AlGaN InGaN InGaAs InAlGaAs, or a column element semiconductor of SiGe), so that an EAM is obtained. The epitaxy structure according to the present invention is in a form of p-i(MQW)-n$^+$-i(collector)-n, where the un-doped depletion layer of the EAM is inserted with an n$^+$ δdoped first n-layer 13, which is served as an electrical field confining layer to make most of the electrical field be concentrated on MQW layer, which has significant quantum-confined-stark-effect to control the transmission of incident photon. (MQW stands for Multiple-Quantum Well.) Consequently, the drive voltage will not be increased as the thickness of the second i-layer 14 (collector) is increased, so that the trade-off between the drive voltage and the speed can be improved to increase the confinement factor of the light in the un-doped layer and to decrease the insertion loss of the light in the doped layer caused by free-carrier absorption. The first i-layer 12 is made of an MQW with stacked hetero-structures, such as InGaAs/InAlAs, InGaAs/InP, InGaAsP/InGaAsP, AlGaAsSb/InGaAs, or AlGaAsSb/GaSb. The bandgap of the MQW has a photon energy approaching that of a 1.55 µm wavelength so that the amount of the absorbed incident photon can be modulated by the external applied voltage. And, the p-layer 11 and the second n-layer 15 are the upper and lower cladding layers of the waveguide owing to their bandgap energy being bigger than that of the operation wavelength.

Figure 2:
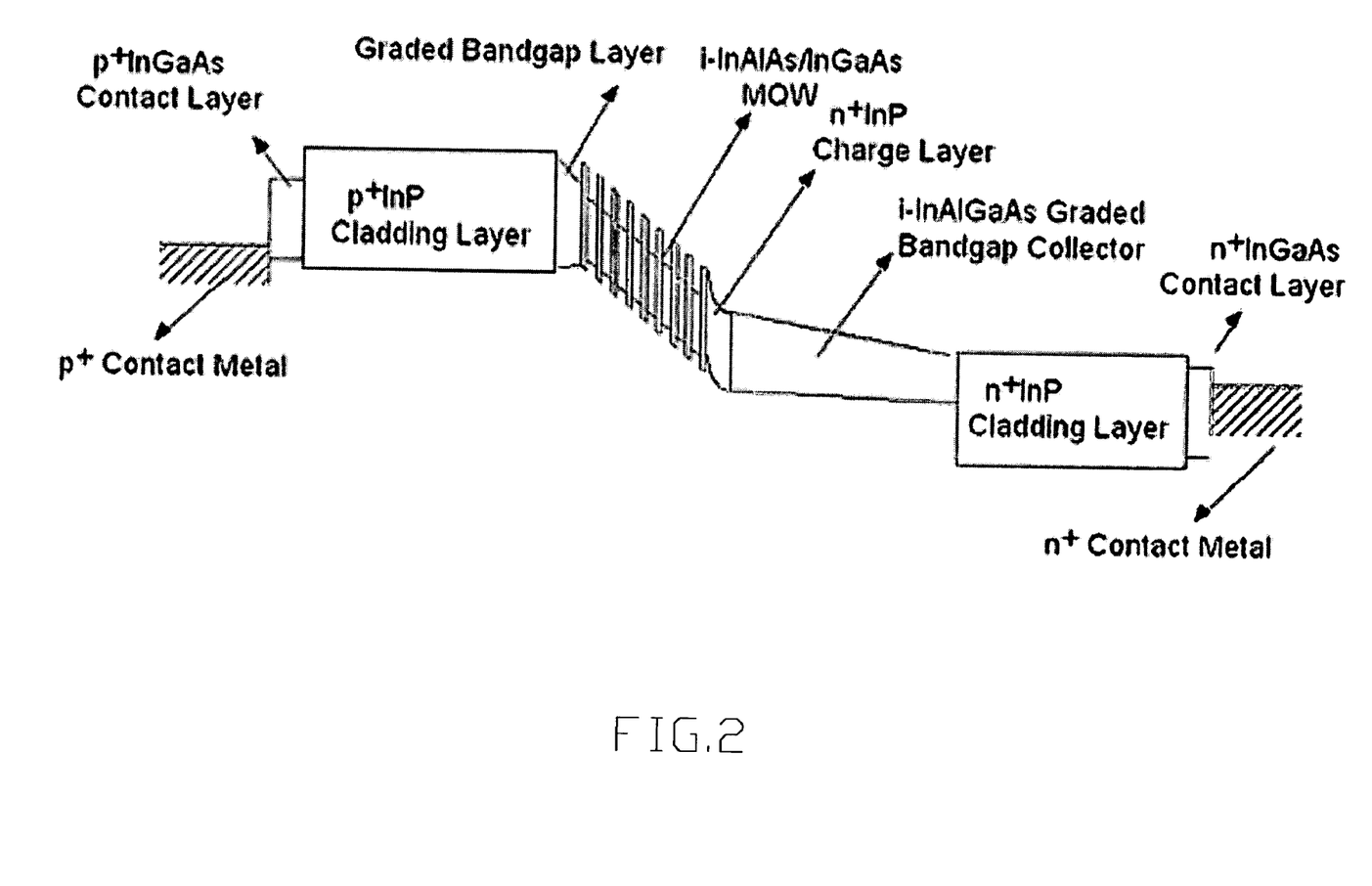
FIG. 2 is a view showing a conceptual band diagram under 1.55 µm wavelength operation of optical fiber communication according to an embodiment of the present invention.

Please refer to FIG. 2, which is a view showing the conceptual band diagram under 1.55 µm wavelength operation of optical fiber communication according to an embodiment of the present invention. As shown in the figure, the MQW is an i-InAlAs/InGaAs MQW clipped by the p+ and the n+ semiconductors to form the core of the waveguide and this MQW can absorb the photon of the 1.55 µm wavelength. Therein, a p+ InP cladding layer and an n+ InP cladding layer are the upper and the lower claddings of the waveguide. By using the InAlGaAs layer of an i-InAlAs graded bandgap collector as an un-doped layer to reduce the capacitance of the components, the graded bandgap layer can obtain a build-in electrical field (~10 kV/cm) so that the photoexited electrons can still be swept to the n+ InP cladding layer in an over-shoot speed of ~4*10$^7$ cm/sec and the high-power performances of the components are greatly improved.

Figure 3:
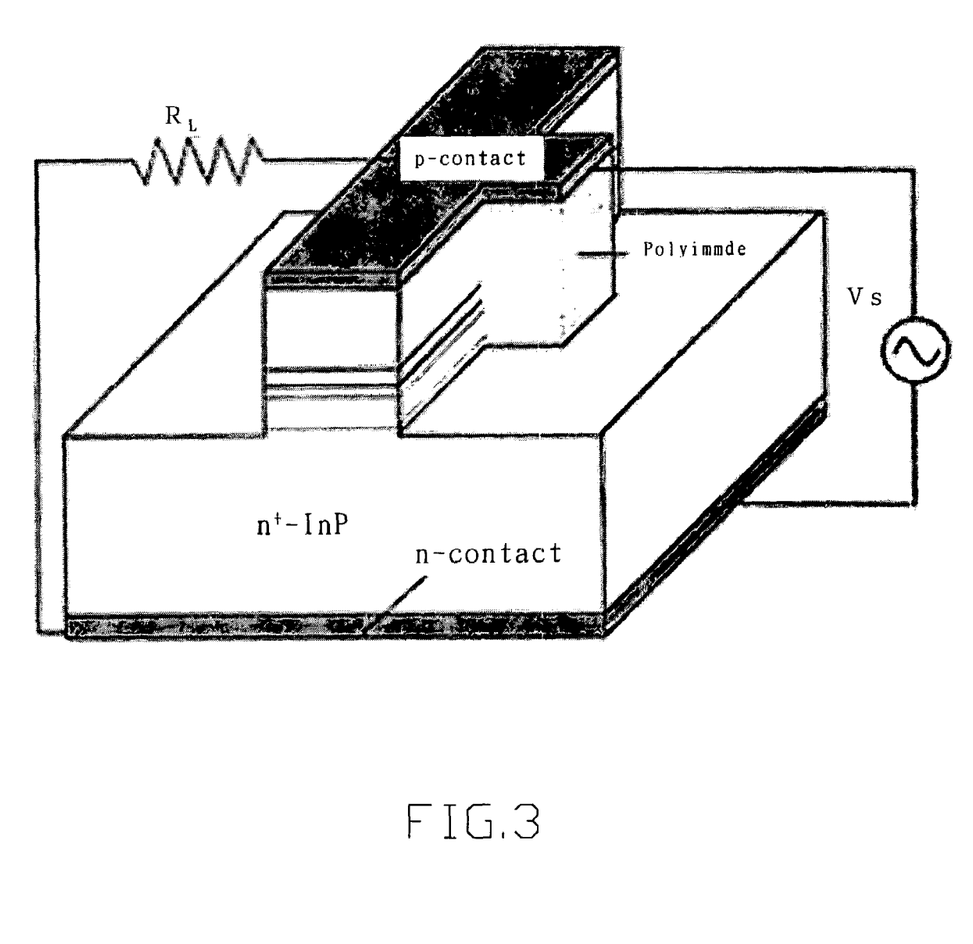
FIG. 3 is a view showing an embodiment of an all-lumped EAM according to the present invention.
Figure 4:
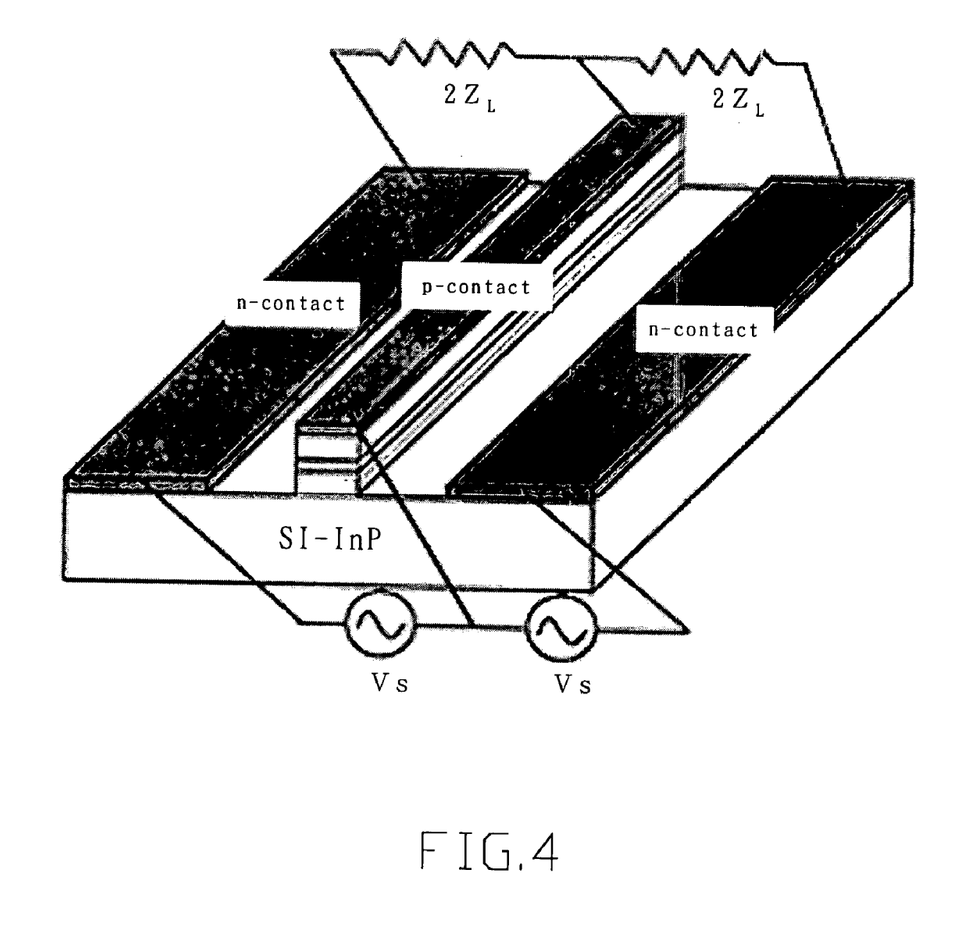
FIG. 4 is a view showing an embodiment of a traveling-wave EAM according to the present invention.

Please refer to FIG. 3 and FIG. 4, which are views showing embodiments of an all-lumped EAM and a traveling-wave one, respectively. As shown in the figures, on the actual making of the epitaxy layer of the EAM according to the present invention, its geometric structure can be an all-lumped structure, whose substrate is an n-doped InP; or a traveling-wave one, whose substrate is a semi-insulated InP. By using the above geometric structure while referring to the simulation result together with proper geometric sizes of traveling-wave electrodes (the width of the active area of the waveguide is 2 µm; the distance between the signal line and the ground plane is 2 µm; and the thicknesses of the MQW of InAlAs/InGaAs and the collector are respectively 200 nm and 400 nm), a bigger characteristic impedance and a smaller mismatching between the velocities of optical wave and microwave can be obtained as compared to the p-i-n structure of a high speed EAM according to the prior art, which means a dramatic improvement in the performance of the traveling-wave EAM.

Figure 6:
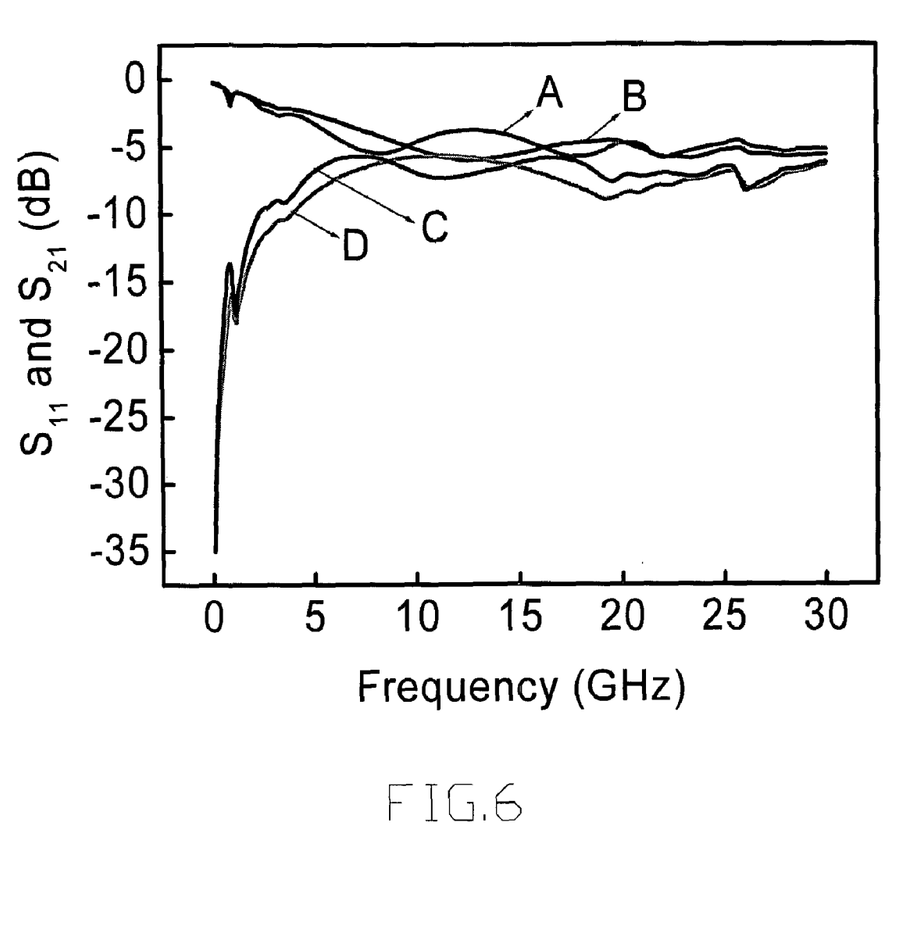
FIG. 6 is a view showing the measured scattering parameters ($S_{11}$ and $S_{21}$) of fabricated traveling-wave EAMs with different epi-layer structures as shown in FIGS. 2 and 5.
Figure 7:
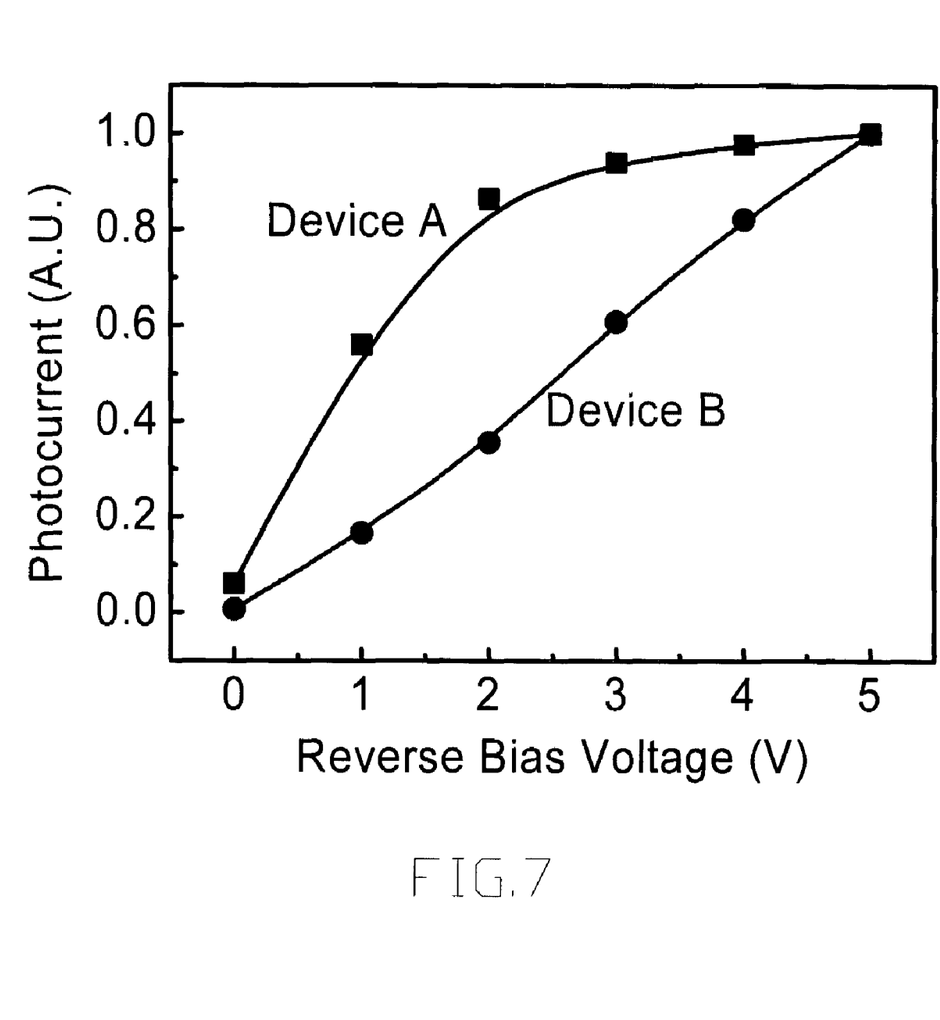
FIG. 7 is a view showing the measured bias dependent photocurrent of the two fabricated devices A and B with different epi-layer structure as shown in FIGS. 2 and 5, respectively.

In order to investigate the validity of our invention, two types of EAMs are fabricated with traveling-wave electrodes as shown in FIG. 4. Device A comprises the epi-layer structure as shown in FIG. 2. Device B comprises a similar epi-layer and geometry structure except it doesn't have an n$^+$ δ-doped layer and can be treated as a traditional p-i-n EAM structure, as shown in FIG. 5. FIG. 6 shows the measured S parameters ($S_{21}$ and $S_{11}$) of both two devices. Trace A is the measured $S_{21}$ of device A under −0.5V bias. Trace B is the measured $S_{21}$ of device B under −0.5V bias. Trace C is the measured $S_{11}$ of device A under −0.5V bias. Trace D is the measured $S_{11}$ of device B under −0.5V bias. Two kinds of devices exhibit almost similar values of S parameters when the frequency is up to 30 GHz and it is concluded that the microwave and speed performances of the EAM will not be affected by the n$^+$ δ-doped layer between two undoped layers. FIG. 7 shows the measured bias dependent photocurrent of two devices. Device A with epi-layer structure of the present invention (FIG. 2) shows much lower drive-voltage than the prior art (FIG. 5), which is shown as device B, and reveals much more significant increasing and saturation of photocurrent than device B does when the bias voltage is increased. The observed phenomenon can be attributed to that the n$^+$ δ-doped layer of device A will confine the electrical field in its MQW layer which will thus have much more significant variation of photocurrent vs. bias voltage than the MQW layer of device B has. According to the measured results, it is concluded that the structure according to the present invention will have much lower drive-voltage and the same excellent microwave performance as compared to the tradition p-i-n structure with similar thickness of intrinsic layer.

To sum up, the present invention can release the trade-off between the component's capacitance and the operation voltage as well as their microwave characteristics can be improved; and the insertion loss is reduced.

The preferred embodiments herein disclosed are not intended to unnecessarily limit the scope of the invention. Therefore, simple modifications or variations belonging to the equivalent of the scope of the claims and the instructions disclosed herein for a patent are all within the scope of the present invention.

What is claimed is:

1. A high-speed electro-absorption modulator (EAM) with low drive voltage, comprising:
    a semiconductor substrate;
    a p-i-n-i-n epitaxy layer including a second intrinsic layer (i-layer) formed on a second n-doped layer (n-layer), a first n-layer formed on said second i-layer, a first i-layer formed on said first n-layer, and a p-doped layer (p-layer) formed on said first i-layer,
    wherein said p-i-n-i-n epitaxy layer is formed on said semiconductor substrate,
    wherein said p-i-n-i-n epitaxy layer is made of a semiconductor of a material and a semiconductor of an alloy of said material, and wherein said material is selected from a group consisting of a compound and a column element,
    wherein said alloy is selected from a group consisting of AlGaN, InGaN, InGaAs, and InAlGaAs.

* * * * *